(12) United States Patent
Madigan et al.

(10) Patent No.: US 12,130,106 B2
(45) Date of Patent: Oct. 29, 2024

(54) SUPPRESSOR

(71) Applicants: Blake Thomas Madigan, Benbrook, TX (US); Matthew William Fuqua, Crowell, TX (US)

(72) Inventors: Blake Thomas Madigan, Benbrook, TX (US); Matthew William Fuqua, Crowell, TX (US)

( * ) Notice: Subject to any disclaimer, the term of this patent is extended or adjusted under 35 U.S.C. 154(b) by 221 days.

(21) Appl. No.: 17/531,086

(22) Filed: Nov. 19, 2021

(65) Prior Publication Data

US 2022/0163281 A1 May 26, 2022

Related U.S. Application Data

(60) Provisional application No. 63/116,270, filed on Nov. 20, 2020.

(51) Int. Cl.
*F41A 21/30* (2006.01)

(52) U.S. Cl.
CPC .................... *F41A 21/30* (2013.01)

(58) Field of Classification Search
CPC ..................................... F41A 21/30
USPC ......................................... 181/223
See application file for complete search history.

(56) References Cited

U.S. PATENT DOCUMENTS

| | | | | |
|---|---|---|---|---|
| 4,291,610 A | * | 9/1981 | Waiser | F41A 21/30 89/14.4 |
| 4,576,083 A | * | 3/1986 | Seberger, Jr. | F01N 1/08 89/14.4 |
| 4,974,489 A | * | 12/1990 | Fishbaugh | F41A 21/30 89/14.4 |
| 5,136,923 A | * | 8/1992 | Walsh, Jr. | F41A 21/30 89/14.4 |
| 7,789,008 B2 | * | 9/2010 | Petersen | F41A 21/30 89/14.4 |
| 8,844,422 B1 | * | 9/2014 | Klett | F41A 21/34 89/14.4 |
| 8,973,481 B2 | * | 3/2015 | Dueck | F41A 21/30 89/14.4 |
| 9,347,727 B1 | * | 5/2016 | Cler | F41A 21/30 |
| 10,234,228 B2 | * | 3/2019 | Person | F41A 21/30 |
| 10,451,374 B2 | * | 10/2019 | Palu | F41A 21/30 |
| 10,976,125 B2 | * | 4/2021 | Hood, II | F41A 21/30 |
| 11,561,059 B2 | * | 1/2023 | Reis-Green | F41A 21/30 |
| 2017/0321984 A1 | * | 11/2017 | Palu | F41A 21/34 |
| 2020/0182578 A1 | * | 6/2020 | Turnblom | F41A 21/30 |

* cited by examiner

*Primary Examiner* — Forrest M Phillips
*Assistant Examiner* — Joseph James Peter Illicete
(74) *Attorney, Agent, or Firm* — Snell & Wilmer L.L.P.

(57) ABSTRACT

A suppressor for a firearm may comprise a baffle stack. The baffle stack may comprise a plurality of baffles coupled along an axis. The plurality of baffles may form an outer fluid path and an inner fluid path that are radially fluidly separate. The outer fluid path may comprise an outer fluid path inlet, which is also an outer fluid path outlet for the outer fluid path, such that gas that enters the outer fluid path through the outer fluid path inlet also exits the outer fluid path through the outer fluid path inlet, and exits the suppressor through the inner fluid path.

17 Claims, 14 Drawing Sheets

SUPPRESSOR

CROSS-REFERENCE TO RELATED APPLICATIONS

This application is a non-provisional of, and claims priority to and the benefit of, U.S. Provisional Patent Application No. 63/116,270, filed Nov. 20, 2020 and entitled "SUPPRESSOR," which is hereby incorporated by reference herein.

FIELD

The present disclosure relates generally to sound dampeners, and more specifically, to suppressors to ameliorate the report of a firearm.

BACKGROUND

Firearms create significant noise when discharged. The amplitude of this noise may be deleterious to the user's hearing, and in some environments, create a safety hazard for the user or nearby people. Moreover, the report of a firearm may draw unwanted attention to the user, or may scare animals. Thus, there remains a need for sound dampeners configured to reduce the amplitude of the noise created by a discharged firearm.

SUMMARY OF THE DISCLOSURE

The present disclosure relates to a sound suppressor for a firearm. In various embodiments, a suppressor may comprise a baffle stack. A baffle stack may comprise a plurality of baffles coupled along an axis. The plurality of baffles may form an outer fluid path and an inner fluid path that are radially fluidly separate. The outer fluid path may comprise an outer fluid path inlet, which is also an outer fluid path outlet for the outer fluid path, such that gas that enters the outer fluid path through the outer fluid path inlet also exits the outer fluid path through the outer fluid path inlet, and exits the suppressor through the inner fluid path.

In various embodiments, the plurality of baffles may comprise a first vented baffle comprising a first inner wall spanning axially between a first inner wall forward edge and a first inner wall aft edge, and a first outer wall spanning axially between a first outer wall forward edge and a first outer wall aft edge, wherein the first vented baffle further comprises a first shoulder spanning radially between the first inner wall and the first outer wall; and a second vented baffle comprising a second inner wall spanning axially between a second inner wall forward edge and a second inner wall aft edge, and a second outer wall spanning axially between a second outer wall forward edge and a second outer wall aft edge, wherein the second vented baffle further comprises a second shoulder spanning radially between the second inner wall and the second outer wall. The second inner wall aft edge may couple to the first inner wall forward edge, such that the first inner wall and the second inner wall form an inner wall of the baffle stack that at least partially surrounds and defines the inner fluid path about the axis. The second outer wall aft edge may couple to the first outer wall forward edge, such that the first outer wall and the second outer wall form an outer wall of the baffle stack, wherein the outer fluid path is at least partially defined radially outwardly by the outer wall and radially inwardly by the inner wall. In various embodiments, the first inner wall forward edge may comprise a first inner wall forward edge shape that is complementary to a second inner wall aft edge shape of the second inner wall aft edge. The first outer wall forward edge may comprise a first outer wall forward edge shape that is complementary to a second outer wall aft edge shape of the second outer wall aft edge. In various embodiments, the first shoulder and the second shoulder may be disposed in the outer fluid path, wherein the first shoulder comprises a first vent disposed therethrough, and wherein the second shoulder comprises a second vent disposed therethrough. The first vent and the second vent may allow gas to flow through the outer fluid path.

In various embodiments, the baffle stack may further comprise a solid baffle comprising a solid baffle inner wall spanning axially between a solid baffle inner wall forward edge and a solid baffle inner wall aft edge, and a solid baffle outer wall spanning axially between a solid baffle outer wall forward edge and a solid baffle outer wall aft edge. The solid baffle may further comprise a solid baffle shoulder spanning radially between the solid baffle inner wall and the solid baffle outer wall. The solid baffle inner wall aft edge may couple to the second inner wall forward edge, such that the solid baffle inner wall is comprised in the inner wall that defines the inner fluid path. The solid baffle outer wall aft edge may couple to the second outer wall forward edge, such that the solid baffle outer wall is comprised in the outer wall. The solid baffle shoulder may be solid and serve as a terminus to the outer fluid path.

In various embodiments, the first vented baffle may comprise a first inlet portion spanning axially between a first inlet edge and the first inner wall aft edge. The first inlet edge may define a first inlet. The second vented baffle may comprise a second inlet portion spanning axially between a second inlet edge and the second inner wall aft edge. The second inlet edge may define a second inlet. The first inlet and the second inlet may be comprised in the inner fluid path. In various embodiments, the first inlet portion may taper outwardly from the first inlet edge to the first inner wall aft edge such that the first inner wall aft edge comprises a larger perimeter than the first inlet. The second inlet portion may taper outwardly from the second inlet edge to the second inner wall aft edge such that the second inner wall aft edge comprises a larger perimeter than the second inlet.

In various embodiments, the inner fluid path may comprise a plurality of baffle spaces. A first baffle space of the plurality of baffle spaces may be defined within the inner wall between the first inlet portion and the second inlet portion, wherein gas may enter the first baffle space through the first inlet, contact the second inlet portion, and exit the first baffle space through the second inlet. In various embodiments, the solid baffle may comprise a solid baffle inlet portion spanning axially between a solid baffle inlet edge and the solid baffle inner wall aft edge, wherein the solid baffle inlet edge defines a solid baffle inlet. A second baffle space of the plurality of baffle spaces may be defined within the inner wall between the second inlet portion and the solid baffle inlet portion, wherein gas may enter the second baffle space through the second inlet, contact the solid baffle inlet portion, and exit the second baffle space through the solid baffle inlet.

In various embodiments, the first inlet portion may comprise a first cutout, such that the first inlet edge defines the first cutout. In various embodiments, the first shoulder of the first vented baffle may comprise the first vent and a first solid portion, wherein the first cutout is at least one of axially or radially aligned with the first solid portion. In various embodiments, the first shoulder may comprise a plurality of first vents including the first vent, wherein the plurality of first vents may be spaced equidistantly about the axis.

In various embodiments, the first inner wall of the first vented baffle may comprise a first neck portion and a first skirt. The first neck portion may be disposed aft of the first shoulder and comprise the first inner wall aft edge. The first skirt may be disposed forward of the first shoulder and comprise the first inner wall forward edge.

In various embodiments, a suppressor may comprise the baffle stack comprising the first and second vented baffles and the solid baffle discussed herein. The outer wall of the baffle stack may be a suppressor outer wall of the suppressor. In various embodiments, the plurality of baffles may be fixedly coupled to one another. In various embodiments, the suppressor may further comprise a blast chamber coupled to an aft-most vented baffle of the plurality of baffles aft of the aft-most vented baffle. The aft-most vented baffle may comprise a vented baffle outer wall spanning between a vented baffle outer wall aft edge and a vented baffle outer wall forward edge. The blast chamber may span axially between a blast chamber forward end and a blast chamber aft end. The blast chamber forward end may comprise a blast chamber coupling edge that couples to the vented baffle outer wall aft edge. The blast chamber aft end may be configured to couple to a firearm. In various embodiments, the suppressor may further comprise an end cap coupled to the solid baffle. The end cap may comprise an end cap coupling edge that couples to the solid baffle outer wall forward edge. In various embodiments, the end cap may comprise a projectile channel disposed through the end cap in fluid communication with the inner fluid path of the baffle stack and axially aligned with a baffle inlet of each of the plurality of baffles. In various embodiments, the end cap may comprise an end cap muzzle, through which a projectile will exit the suppressor during use. The end cap may comprise a flash hider comprising a plurality of protrusions protruding in a forward direction around the suppressor muzzle.

In various embodiments, a method of assembling a baffle stack may comprise coupling baffles to one another (e.g., vented baffles and/or solid baffle(s)), coupling a blast chamber to a baffle, and coupling an end cap to a baffle, as discussed herein.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with like element numbering throughout the figures are intended to be the same.

DETAILED DESCRIPTION

Figure 1A:
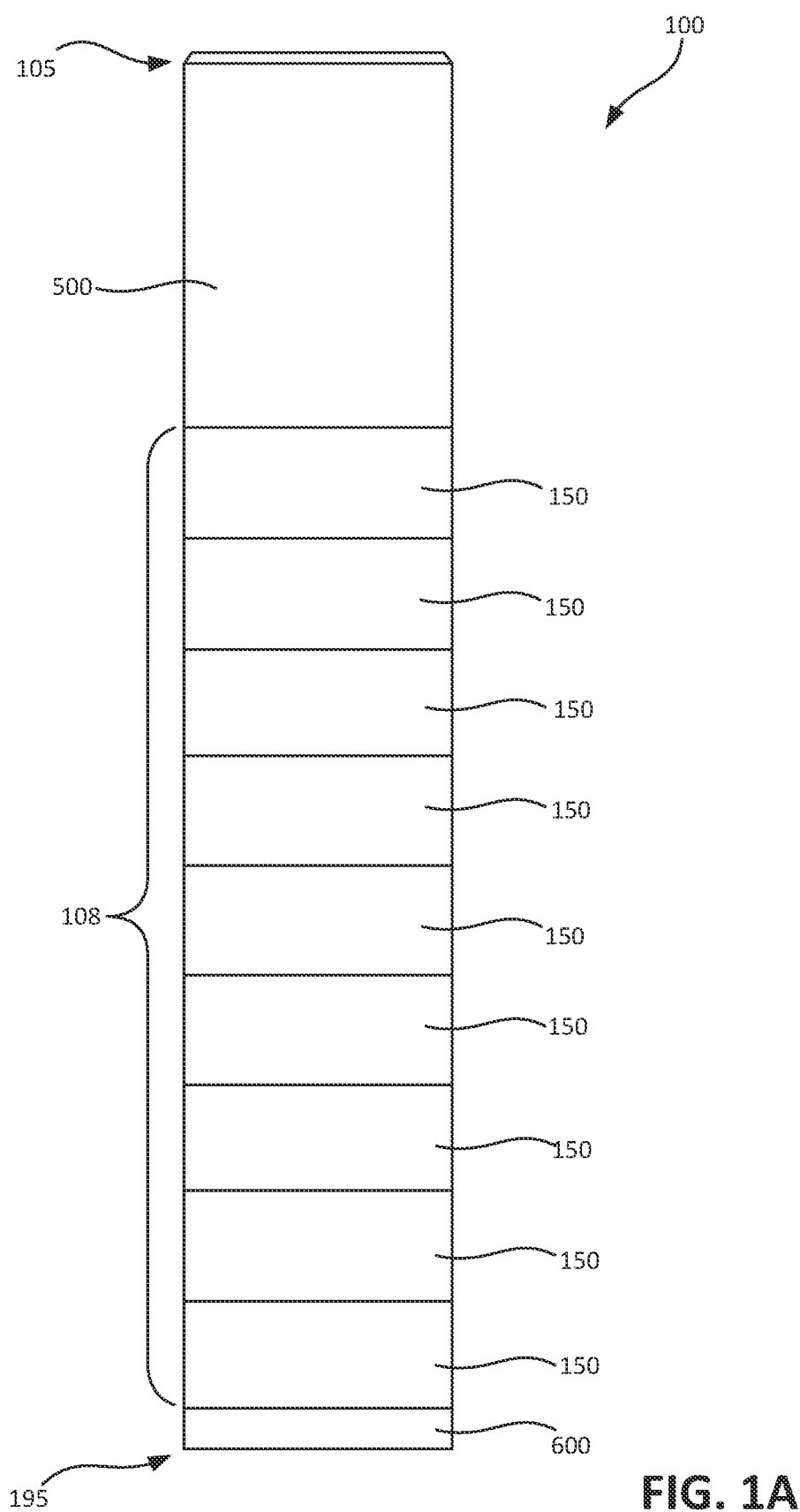
FIG. 1A illustrates a suppressor for a firearm, in accordance with various embodiments.

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item. Further, reference to, e.g., a "first" item and a "second" item does not mean that there are no intervening items, and such intervening items may be present.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any combination and/or order and are not necessarily limited to the order or combination presented. Furthermore, any reference to singular includes plural embodiments, and any reference to more than one component or step may include a singular component or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, the term "aft," "rear," or the like refers to the direction associated with a butt (e.g., the back or rear end) of a firearm or the breech of a firearm barrel, or generally, to the direction of recoil in response to firing a round or cartridge in a firearm. As used herein, the term "forward," "front," or the like refers to the direction associated with a muzzle (e.g., the front end) of the firearm or barrel, or generally, to the direction of flight of a projectile (e.g., a bullet) fired from a firearm. An A-R axis has been included to illustrate the axial (A) and radial (R) directions. A circumferential direction may span about an axis (e.g., axis 95 discussed herein). For clarity, axial axis A spans parallel to axis 95 (e.g., the axis along which a bullet will travel in response to being fired from a firearm). As utilized herein, radially "inward" or "inner" refers to the negative R direction towards axis 95, and radially "outward" or "outer" refers to the R direction away from axis 95.

In various embodiments, with reference to FIG. 1A, a suppressor 100 for a firearm may span between an aft end 105 and a forward end 195. Suppressor 100 may comprise a baffle stack 108 comprising a plurality of baffles 150 spanning between aft end 105 and forward end 195.

Figure 5A:
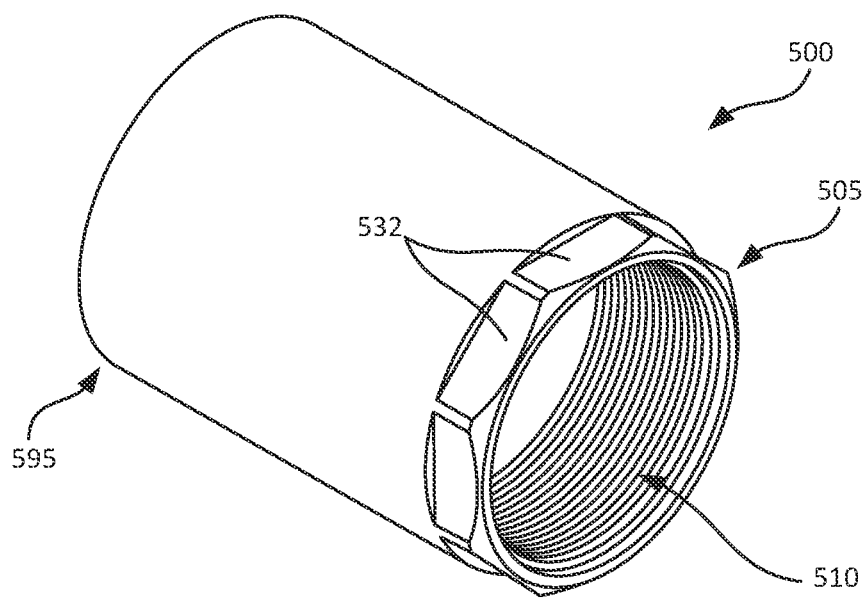
FIG. 5A illustrates a rear perspective view of a blast chamber for a suppressor, in accordance with various embodiments.
Figure 5B:
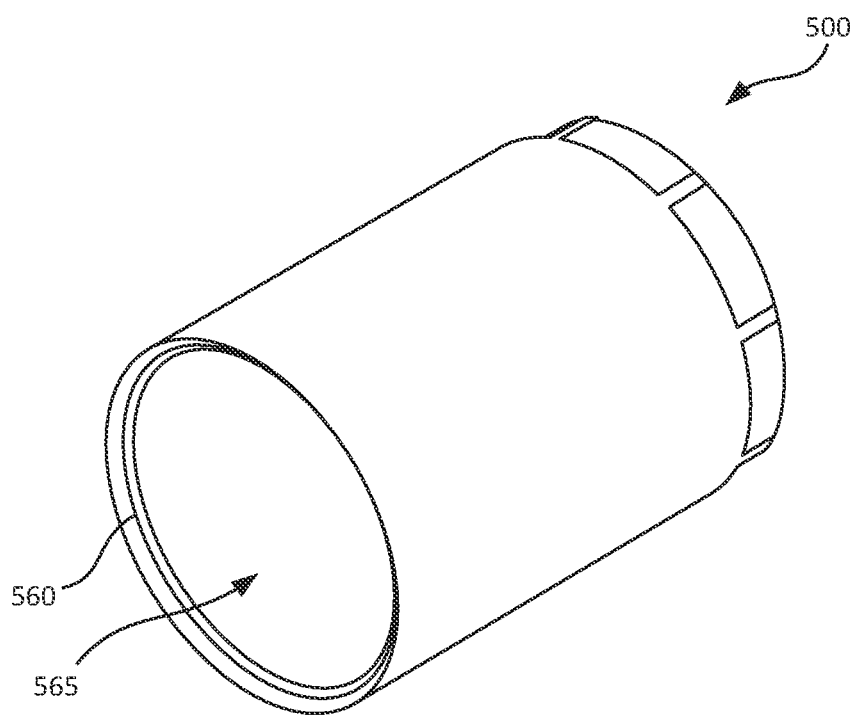
FIG. 5B illustrates a front perspective view of the blast chamber of FIG. 5A, in accordance with various embodiments.

Suppressor 100 may comprise a blast chamber 500 at aft end 105. Blast chamber 500 may be coupled to an aft-most baffle 150 of the plurality of baffles 150. With additional reference to FIGS. 5A and 5B, blast chamber 500 may span axially (e.g., along axis 95) between a blast chamber aft end 505 and a blast chamber forward end 595. Blast chamber forward end 595 may be configured to couple to a baffle 150 of the baffle stack 108 (e.g., the aft-most baffle 150). Blast chamber aft end 505 may be configured to couple to a firearm. Thus, blast chamber 500 may be configured to couple suppressor 100 to a firearm. In various embodiments, blast chamber 500 may comprise any suitable mechanism to couple to a firearm, such as threading, a clamp or other tension device, and/or the like. Blast chamber 500 comprises threading 510, which may couple with complementary threading on a muzzle or barrel of a firearm. In various embodiments, blast chamber 500 comprises lug recesses 532 configured to be engageable by a tool (e.g., a wrench) to aid in attaching or detaching suppressor 100 onto a firearm (e.g., by twisting or screwing suppressor 100 onto the firearm via threading 510).

Figure 2A:
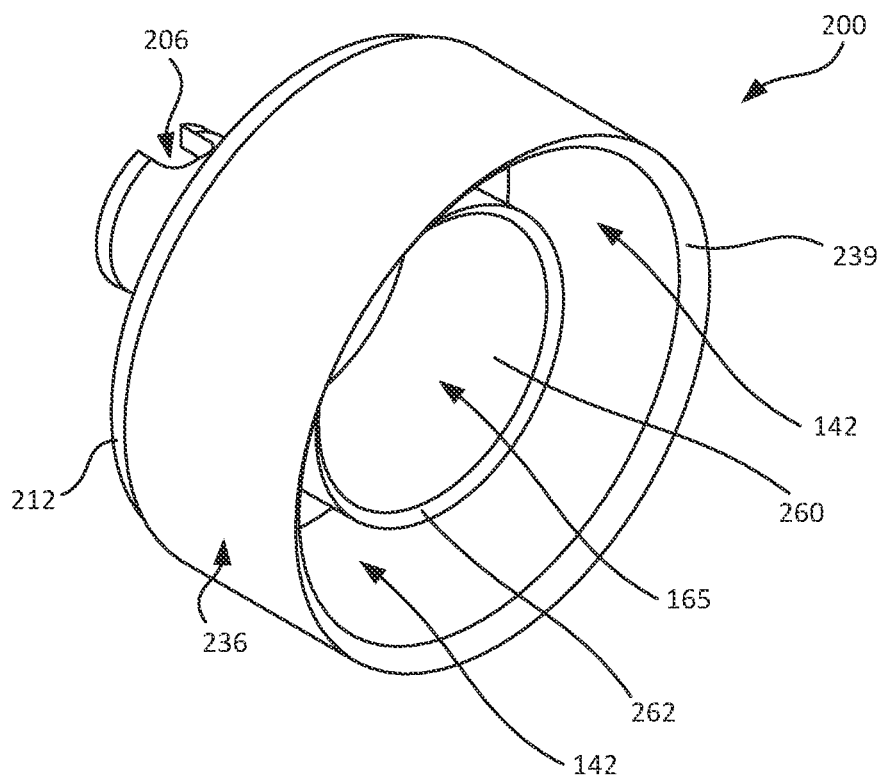
FIG. 2A illustrates a front perspective view of a vented baffle for a suppressor, in accordance with various embodiments.
Figure 6A:
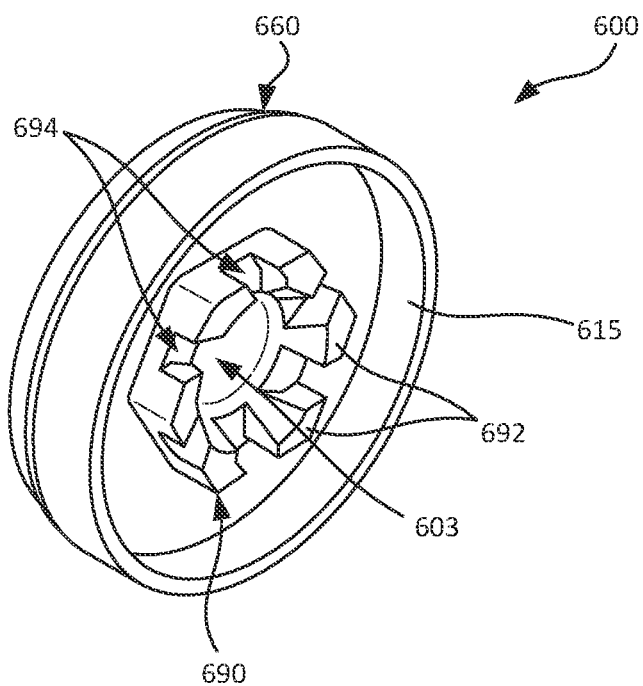
FIG. 6A illustrates a front perspective view of an end cap for a suppressor, in accordance with various embodiments.
Figure 6B:
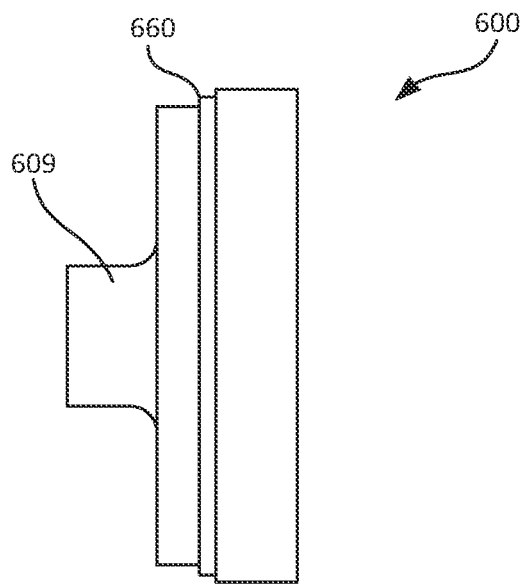
FIG. 6B illustrates a side view of the end cap of FIG. 6A, in accordance with various embodiments.

Suppressor 100 may comprise an end cap 600 at forward end 195. With additional reference to FIGS. 6A and 6B, end cap 600 may be configured to couple to a forward-most baffle 150 of baffle stack 108. End cap 600 may comprise a projectile channel 603 disposed therethrough defined by end cap tube 609. Projectile channel 603 may be configured to receive a projectile exiting suppressor 100, for example, a bullet being fired from a firearm and through suppressor 100. Projectile channel 603 may be axially aligned with a bore of the firearm and suppressor 100, and with baffle inlets of the baffles in the baffle stack (e.g., along axis 95, depicted in FIG. 2A). In various embodiments, end cap 600 may comprise a flash hider 690. Flash hider 690 may comprise protrusions 692 protruding from a front surface of end cap 600 in a forward direction. Protrusions 692 may be spaced around a muzzle (a forward portion of end cap tube 609) in any suitable arrangement. For example, protrusions 692 maybe spaced equidistantly around the end cap muzzle. The end cap muzzle may also be the suppressor muzzle (e.g., the exit point for a projectile out of suppressor 100). Flash hider 690 may further comprise gaps 694 between protrusions 692. Flash hider 690 may function to disperse unignited gunpowder exiting suppressor 100 in different directions (e.g., directed through gaps 694 by protrusions 692), thus decreasing the concentration of such unignited gunpowder directly outside suppressor 100 that may ignite and create a significant flash. The configuration of protrusions 692 and gaps 694 may also allow for the application of a tool having a complementary shape to disengage end cap 600 from the rest of suppressor 100 (e.g., by twisting end cap 600 by engaging the tool with protrusions 692 and gaps 694).

Figure 1B:
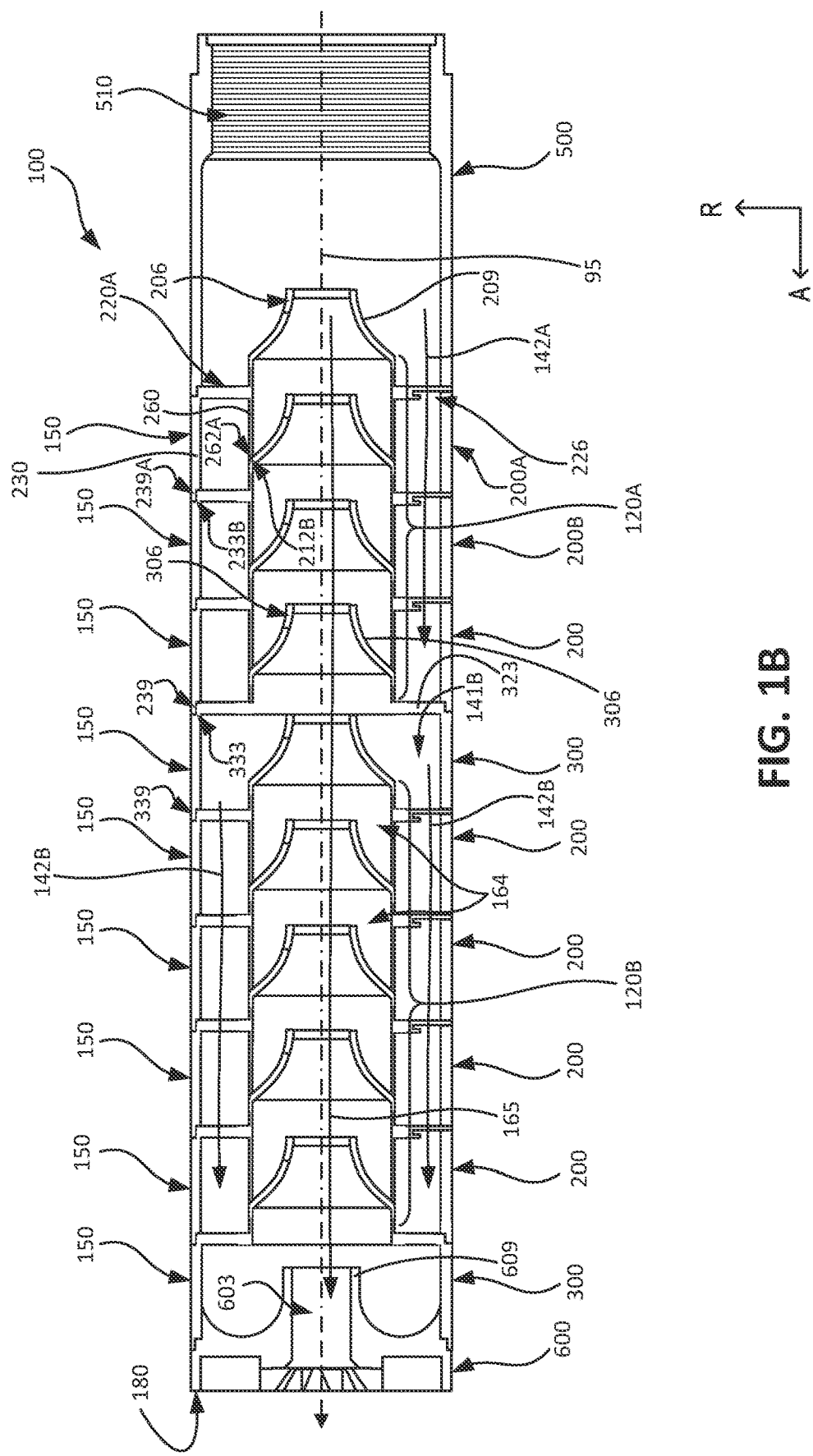
FIG. 1B illustrates a cross-sectional view of the suppressor of FIG. 1A, in accordance with various embodiments.
Figure 1C:
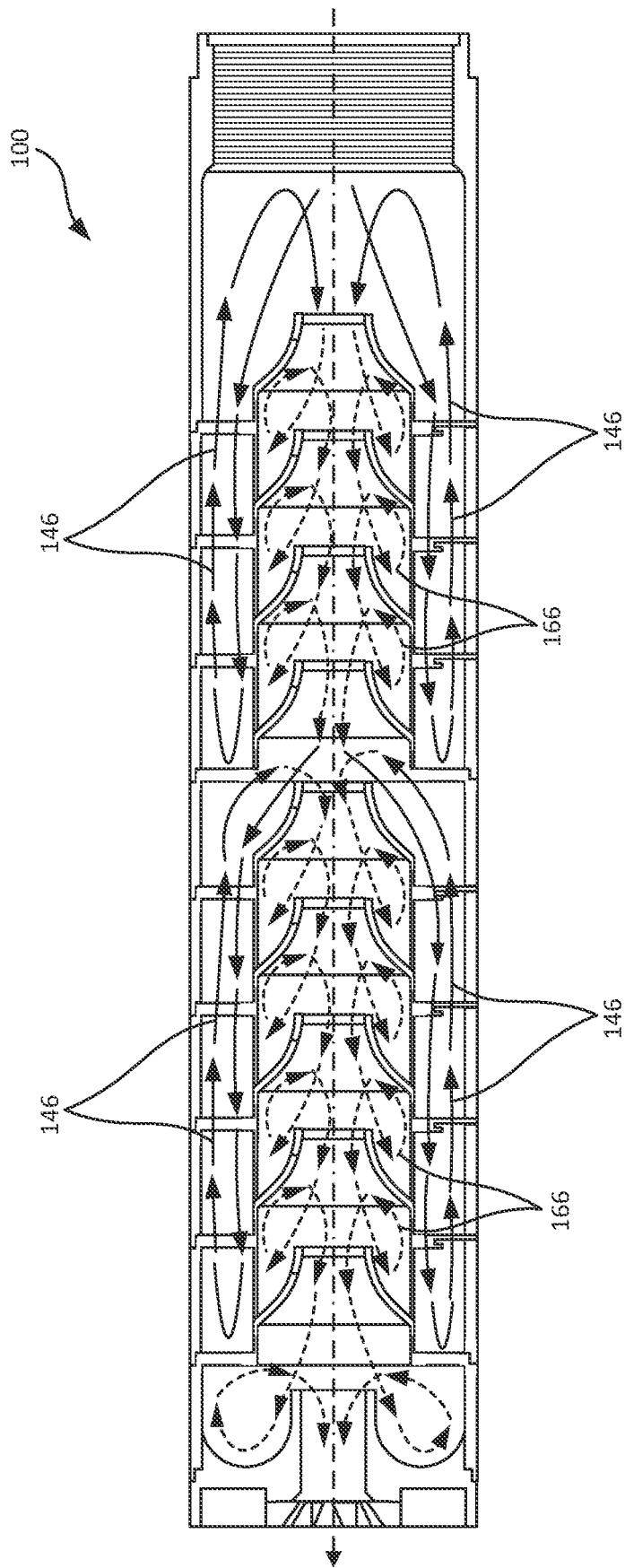
FIG. 1C illustrates a cross-sectional view of the suppressor of FIG. 1A showing gas flow therein, in accordance with various embodiments.

In various embodiments, baffles 150 may be coupled to one another in baffle stack 108 as depicted in the cross-sectional view of suppressor 100 shown in FIG. 1B. Baffles 150 may be coupled to one another along, and/or be disposed about, axis 95. Baffles 150 may be coupled such that an outer fluid path (e.g., outer fluid paths 142A and 142B) and an inner fluid path (the fluid path generally along axis 95 and through the radially inward portion of baffles 150, e.g., inner fluid path 165) are formed. The outer fluid path may be radially outward of the inner fluid path. The outer fluid path and the inner fluid path may be co-axial and/or concentric with one another. The cross-sectional shape of suppressor 100, the outer fluid path, and/or the inner fluid path may be any suitable shape (e.g., a circle (forming a cylindrical shape), oval, square, rectangle, hexagon, octagon, or an irregular or nongeometric shape). In various embodiments, the outer fluid path may be substantially fluidly separate from the inner fluid path in the radial direction (that is, gas may be at least partially prevented from traveling between the outer fluid path and the inner fluid path in a radial direction). An outer fluid path (e.g., outer fluid path 142B) may comprise an outer fluid path inlet 141B. An outer fluid path may have no outlet other than the outer fluid path inlet. Thus, as shown in FIG. 1C depicting gas flow within a cross-sectional view of suppressor 100 (same view as shown in FIG. 1B) gas 146 traveling in the outer fluid paths may enter the respective outer fluid path through the outer fluid path inlet (e.g., enter outer fluid path 142B through outer fluid path inlet 141B), and then exit the outer fluid path through the outer fluid path inlet (the same way such gas entered the outer fluid path).

Gas that enters suppressor 100 travels through inner fluid path 165, either initially, or after entering and exiting an outer fluid path. Inner fluid path 165 is defined by an inner wall (e.g., inner wall 120A and 120B) of the baffle stack, which at least partially surrounds inner fluid path 165 about axis 95. The inner wall may be formed by baffle inner walls comprised in baffles 150, as described herein. The outer fluid path(s) may be defined by and disposed between the inner wall(s) (e.g., inner wall 120A and 120B) and an outer wall 180 of the baffle stack. Outer wall 180 may be formed by outer walls of baffles 150, as described herein. Outer wall 180 may be disposed radially outward of the inner wall (e.g., inner wall 120A and 120B).

A suppressor, or baffle stack therein, may comprise any suitable number of baffles 150. In various embodiments, a baffle stack may comprise at least one vented baffle 200 and at least one solid baffle 300.

Figure 4A:
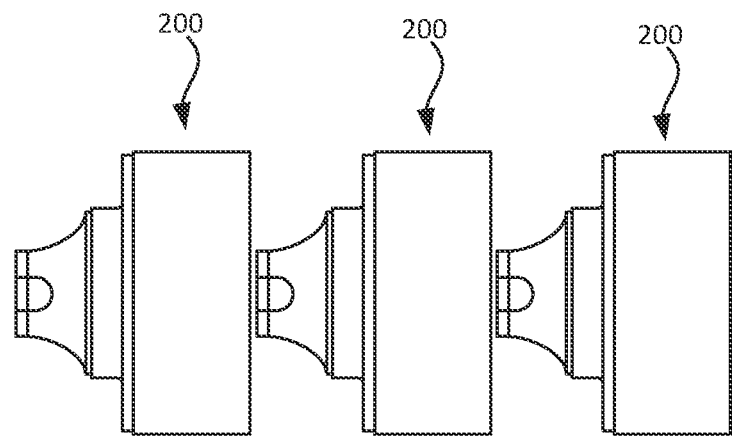
FIG. 4A illustrates a side exploded view of at least a portion of a baffle stack for a suppressor, in accordance with various embodiments.
Figure 4B:
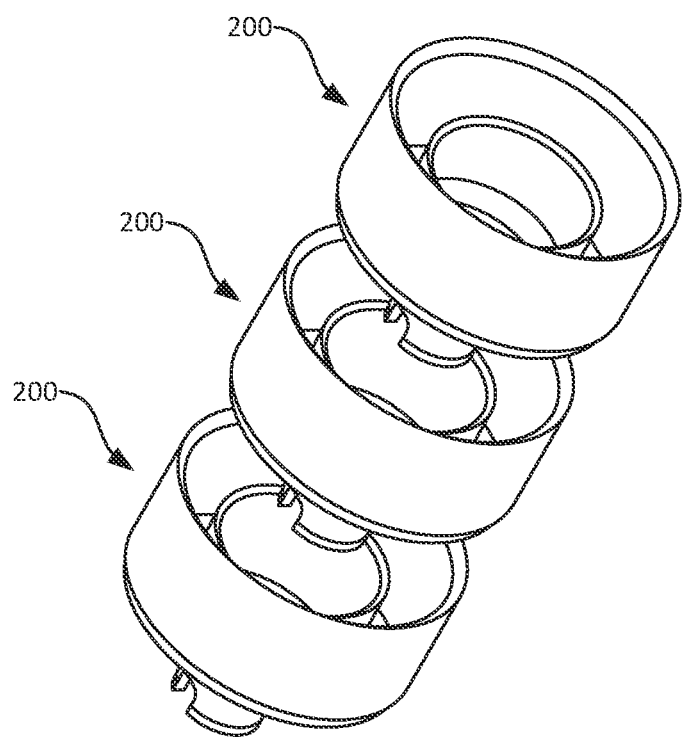
FIG. 4B illustrates a front perspective exploded view of at least a portion of a baffle stack for a suppressor, in accordance with various embodiments.
Figure 4C:
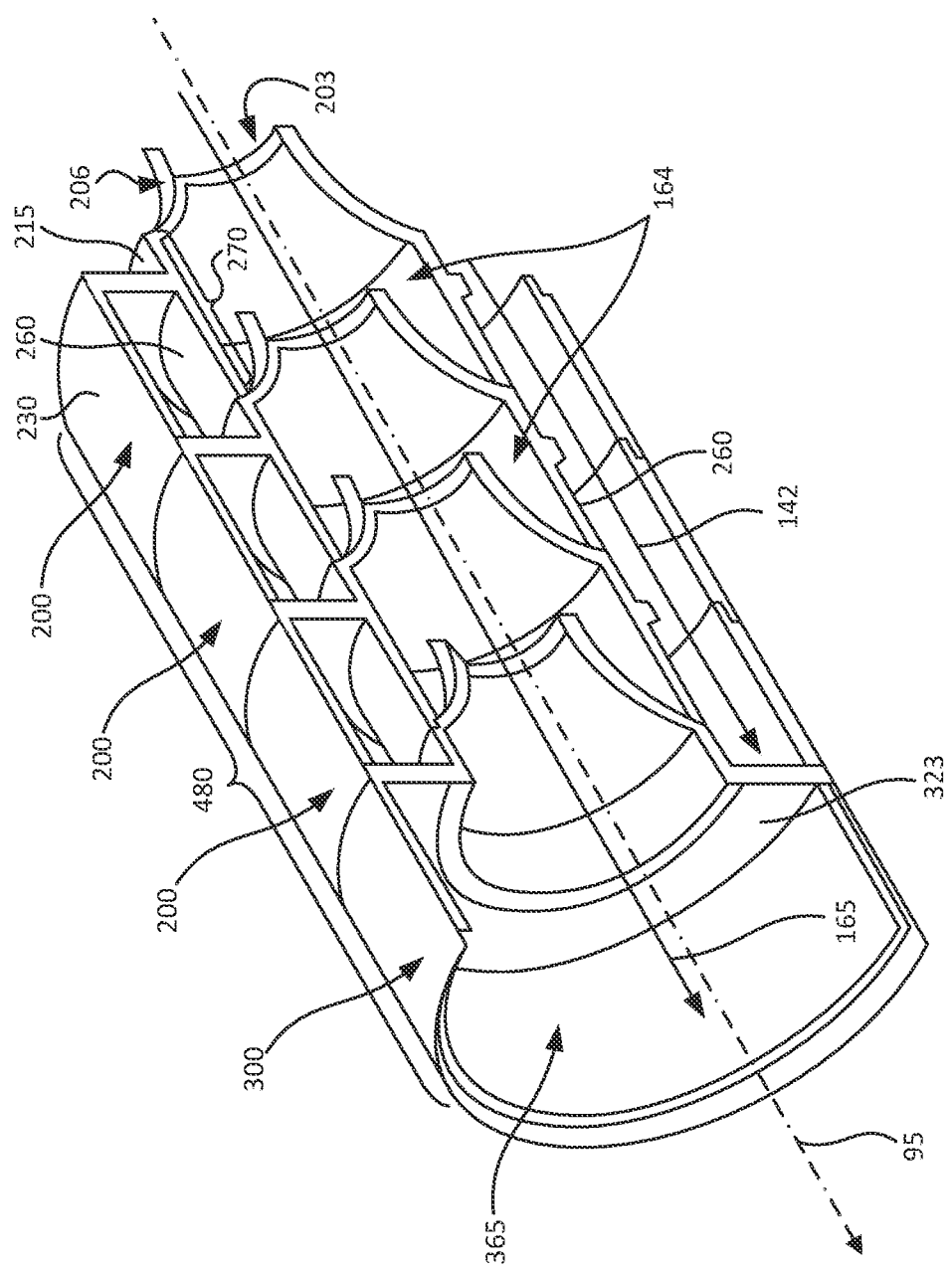
FIG. 4C illustrates a front perspective cross-sectional view of at least a portion of a baffle stack for a suppressor, in accordance with various embodiments.

With reference to FIGS. 2A-2E, a vented baffle 200 is depicted. With additional reference to FIG. 4C, a cross-sectional view of a baffle stack 480 comprising three vented baffles 200 is depicted. In various embodiments, a vented baffle 200 comprises a baffle inner wall 270, a baffle outer wall 230, and a shoulder 220 spanning between baffle inner wall 270 and baffle outer wall 230. Baffle inner wall 270 of vented baffle 200 may span axially between an inner wall aft edge 212 and an inner wall forward edge 262. In various embodiments, baffle inner wall 270 of vented baffle 200 may comprise a neck portion 215 and a skirt 260. Neck portion 215 may be aft of shoulder 220 and skirt 262 may be forward of shoulder 220. Neck portion 215 may span axially between inner wall aft edge 212 and shoulder 220. Skirt 260 may span axially between shoulder 220 and inner wall forward edge 262. In various embodiments, baffle outer wall 230 may span axially between an outer wall aft edge 233 and outer wall forward end 239. Baffle outer wall 230 of vented baffle 200 may be radially outward of baffle inner wall 270. Skirt 260 may be disposed at least partially within baffle outer wall 230. Outer fluid path 142 (or a portion thereof) of the baffle stack or suppressor may be disposed between baffle inner wall 270 and baffle outer wall 230. Inner fluid path 165 (or a portion thereof) may be disposed in, and/or at least partially surrounded about axis 95 by, baffle inner wall 270.

Figure 2B:
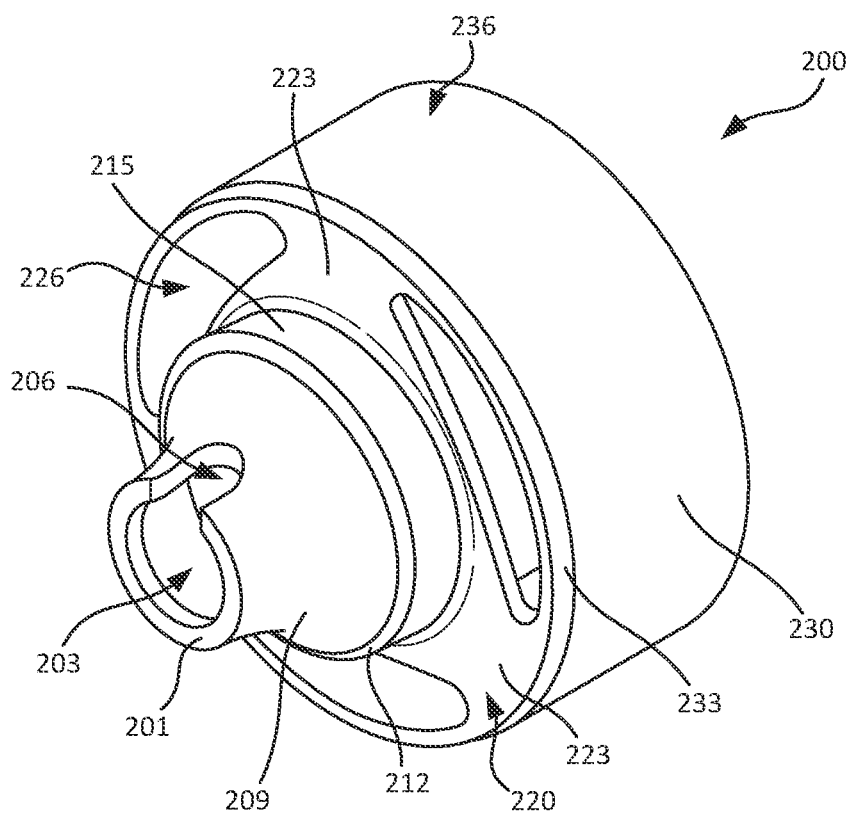
FIG. 2B illustrates a rear perspective view of the baffle for a suppressor of FIG. 2A, in accordance with various embodiments.
Figure 2C:
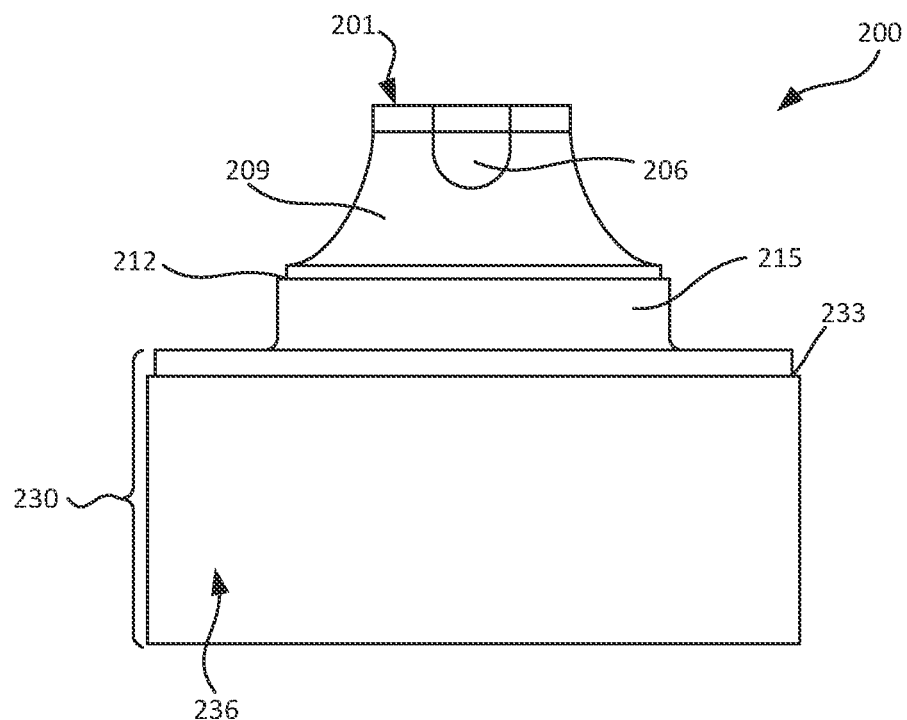
FIG. 2C illustrates a side view of the baffle for a suppressor of FIGS. 2A and 2B, in accordance with various embodiments.
Figure 2D:
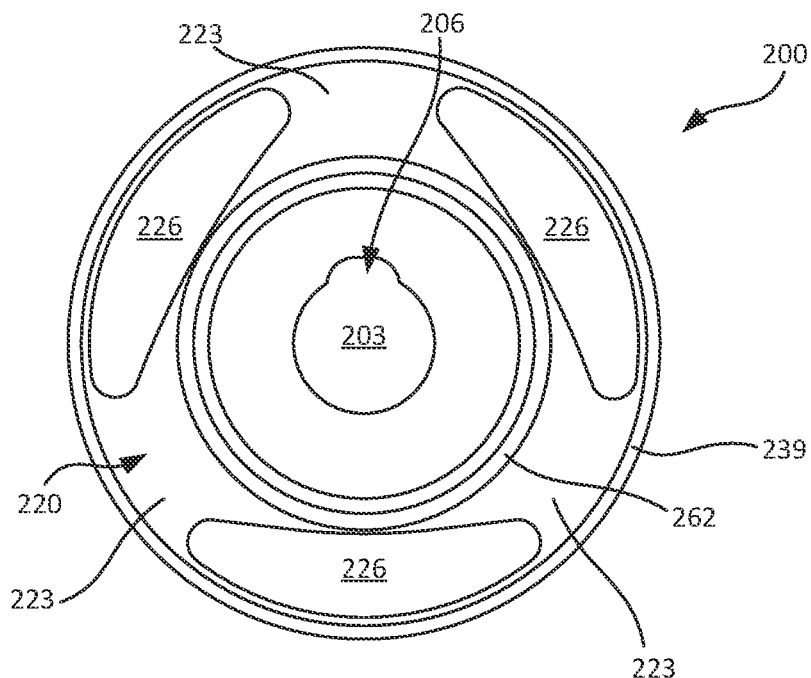
FIG. 2D illustrates a front view of the baffle for a suppressor of FIGS. 2A-2C, in accordance with various embodiments.
Figure 2E:
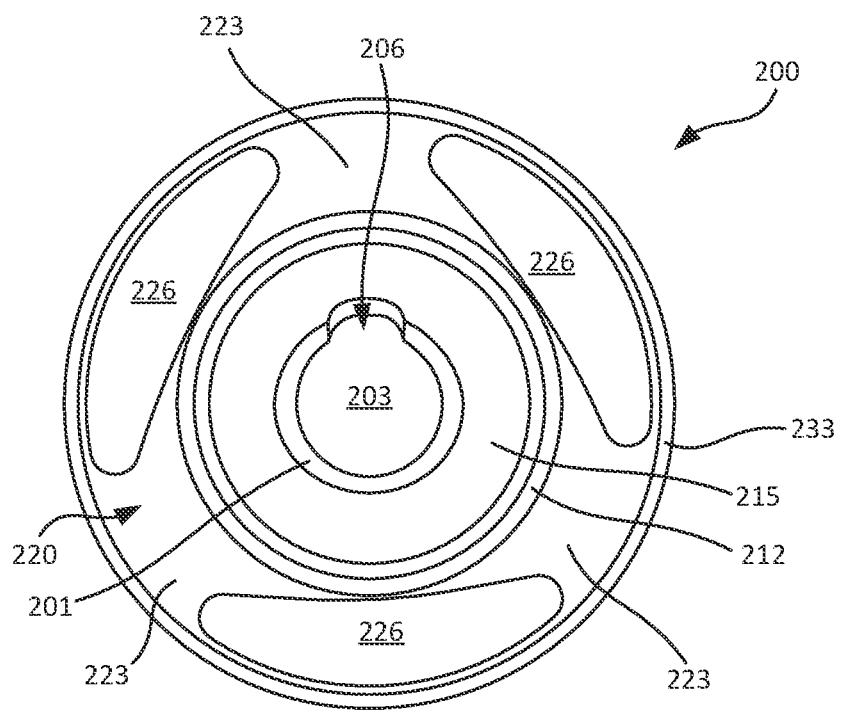
FIG. 2E illustrates a rear view of the baffle for a suppressor of FIGS. 2A-2D, in accordance with various embodiments.

Shoulder 220 of vented baffle 200 may span radially between baffle inner wall 270 and baffle outer wall 230. Shoulder 220 may comprise one or more vents 226 disposed therethrough, and one or more solid portions 223. Vents 226 may be in any suitable number or arrangement. As shown in FIGS. 2B, 2D, and 2E, three vents 226 are disposed through shoulder 220, and spaced equidistantly about a center of baffle 200 (e.g., about axis 95). In various embodiments, a vented baffle may comprise one, two, four, five, or any other number of vents through the baffle shoulder. For example, one half of the baffle shoulder (e.g., shoulder 220) may comprise a vent, and the other half may comprise a solid portion. As another example a vent may be disposed on a half of the baffle shoulder, without taking up the entire half, and the other half may be a solid portion. As another example, multiple vents may be disposed equidistantly around baffle shoulder, or may be disposed irregularly around the baffle shoulder.

In various embodiments, vented baffle 200 may comprise an inlet portion 209. The inlet portion of a vented baffle may comprise any surface radially inward from the baffle inner wall with an inlet disposed therethrough. Therefore, the inlet portion of a vented baffle may comprise a substantially flat surface spanning radially inward from the baffle inner wall and defining an inlet. In various embodiments, an inlet portion of a vented baffle may be directly coupled to a baffle shoulder. In various embodiments, inlet portion 209 of vented baffle 200 spans axially between an inlet edge 201 and neck portion 215 or inner wall aft edge 212. Inlet portion 209 may taper radially outward (e.g., in a forward direction) from inlet edge 201 to inner wall aft edge 212, such that inner wall aft edge 212 comprises a larger perimeter (e.g., circumference) than inlet edge 201. Inlet edge 201 may be the aft-most portion of vented baffle 200 in a baffle stack. Inlet edge 201 may define a baffle inlet 203 through which gas and/or a projectile may travel through inner fluid path 165 (e.g., baffle inlet 203 may be comprised in inner fluid path 165).

In various embodiments, inlet portion 209 may comprise a cutout 206 spanning axially from inlet edge 201 in a forward direction. Cutout 206 may be fluidly coupled to baffle inlet 203 such that gas may travel through 206 as part of flowing through inner fluid path 165 of a baffle stack or suppressor. In various embodiments, cutout 206 may be aligned in the radial direction and/or axial direction with a solid portion 223 of shoulder 220. That is, cutout 206 may be disposed on the same radial plane extending along and from axis 95 as a solid portion 223. Such an orientation may have a beneficial sound suppression effect.

In various embodiments, vented baffles 200 may be configured to couple to one another to form at least a portion of the respective baffle stack, and the inner fluid path and outer fluid path therein. With reference to FIGS. 1B, 2A-2E, and 4C, a first vented baffle 200A may couple to a second vented baffle 200B as part of suppressor 100. In various embodiments, the inner wall forward edge 262A of first vented baffle 200A may couple to the inner wall aft edge 212B of second vented baffle 200B. Thus, the inner wall 270 of first vented baffle 200A couples to the inner wall 270 of second vented baffle 200B, forming inner wall 120A (or a portion thereof). In various embodiments, inner wall forward edge 262 of a vented baffle 200 may have a shape that is complementary to a shape of inner wall aft edge 212, which may facilitate coupling between such edges of two vented baffles 200 (e.g., providing a tight fit that is at least partially air-tight, such that little or no gas may flow radially between the coupled vented baffles 200). For example, as seen in FIG. 2C, inner surface aft edge 212 may comprise a radial recess disposed in baffle inner wall 270 (or neck portion 215 thereof) such that inner surface aft edge 212 comprises a shape having a 90-degree angle, and the inner surface forward edge may comprise a similar recess (e.g., in an inner surface of baffle inner wall 270) having a complementary shape with a complementary 90-degree angle.

In various embodiments, the outer wall forward edge 239A of first vented baffle 200A may couple to the outer wall aft edge 233B of second vented baffle 200B. Thus, the outer wall 230 of first vented baffle 200A couples to the outer wall 230 of second vented baffle 200B, forming outer wall 180 (or a portion thereof). Shoulders 220 of the vented baffles 200A and 200B are disposed in outer fluid path 142A, with vents 226 allowing the passage of gas therethrough. In various embodiments, the vents of vented baffles in a baffle stack may be axially aligned within one another, or the vents may be misaligned with one another. In various embodiments, outer wall forward edge 239 of a vented baffle 200 may have a shape that is complementary to a shape of outer wall aft edge 233, which may facilitate coupling between such edges of two vented baffles 200 (e.g., providing a tight fit that is at least partially air-tight, such that little or no gas may flow radially between the coupled vented baffles 200). For example, outer wall forward edge 239 and outer wall aft edge 233 of a vented baffle 200 may comprise complementary shapes similar to those described in relation to inner wall forward edge 262 and inner surface aft edge 212 of a vented baffle 200, discussed above.

In accordance with the above discussion, any suitable number of vented baffles 200 may be coupled to one another along an axis 95 to form a baffle stack 108 and/or suppressor 100 (or a portion thereof). In various embodiments, the cutout 206 of each vented baffle 200 may be aligned along a radial plane extending along and from axis 95 (i.e., the cutouts 206 of vented baffles 200 may be at the same rotational position about axis 95). In various embodiments, the cutout 206 of each vented baffle 200 may be misaligned along a radial plane extending along and from axis 95 (i.e., the cutouts 206 of vented baffles 200 may be at different rotational positions about axis 95).

In various embodiments, a baffle stack 108 and/or suppressor 100 may comprise at least one solid baffle 300 (also one of baffles 150) coupled to a vented baffles 200 forward of one or more vented baffles 200. A solid baffle 300 coupled to one or more vented baffles 200 may be configured to provide an end or terminus to the respective outer fluid path of the baffle stack.

With reference to FIGS. 3A-3E, a solid baffle 300 is depicted. With additional reference to FIG. 4C, a cross-sectional view of a baffle stack 480 comprising a solid baffle 300 coupled to the forward-most vented baffle 200 is depicted. In various embodiments, a solid baffle 300 may comprise a solid baffle outer wall 330 and a shoulder 320 spanning radially inward from solid baffle outer wall 330. In various embodiments, solid baffle 300 may comprise a neck portion 315 spanning axially in an aft direction from shoulder 320. Neck portion 315 (which may be a baffle inner wall for solid baffle 300) may span axially between inner wall aft edge 312 and an inner wall forward edge (or shoulder 320). Unlike a vented baffle 200, solid baffle 300 may not comprise a skirt forward of shoulder 320. In various embodiments, baffle outer wall 330 may span axially between an outer wall aft edge 333 and outer wall forward end 339. In various embodiments, a portion of outer fluid path 142 within solid baffle 300 of the baffle stack or suppressor may be disposed between neck portion 315 of a solid baffle 300 and a baffle outer wall 230 of the vented baffle 200 coupled to solid baffle 300 (if solid baffle 300 comprises a neck portion 315 (e.g., solid baffle inlet portion 309 may couple directly to shoulder 320)). Inner fluid path 165 may be disposed in, and/or at least partially surrounded about axis 95 by, neck portion 315 (if solid baffle 300 comprises a neck portion 315).

In various embodiments, solid baffle 300 may comprise an inlet portion 309. The inlet portion of a solid baffle may comprise any surface radially inward from the baffle outer wall 330 with an inlet disposed therethrough. Therefore, the inlet portion of a solid baffle may comprise a substantially flat surface spanning radially inward from the baffle outer wall 330 (or from neck portion 315) and defining an inlet. In various embodiments, an inlet portion of a solid baffle may be directly coupled to the solid baffle shoulder. In various embodiments, inlet portion 309 of solid baffle 300 spans axially between an inlet edge 301 and neck portion 315 or inner wall aft edge 312. Inlet portion 309 may taper radially outward (e.g., in a forward direction) from inlet edge 301 to inner wall aft edge 312, such that inner wall aft edge 312 comprises a larger perimeter (e.g., circumference) than inlet edge 301. Inlet edge 301 may be the aft-most portion of solid baffle 300 in a baffle stack. Inlet edge 301 may define a baffle inlet 303 through which gas and/or a projectile may travel through inner fluid path 165 (e.g., solid baffle inlet 303 may be comprised in inner fluid path 165). In various embodiments, inlet portion 309 may comprise a cutout 306 spanning axially from inlet edge 301 in a forward direction. Cutout 306 may be fluidly coupled to baffle inlet 303 such that gas may travel through 306 as part of flowing through inner fluid path 165 of a baffle stack or suppressor.

Shoulder 320 of solid baffle 300 may span radially inward from solid baffle outer wall 330. Shoulder 320 may be solid or impermeable (i.e., having not vents disposed therethrough) such that little or no gas can (e.g., axially) travel through shoulder 320. Thus, in response to solid baffle 300 being coupled to a vented baffle 200, shoulder 320 being disposed in outer fluid path 142 may provide a forward terminus or end of the respective outer fluid path 142.

Figure 3A:
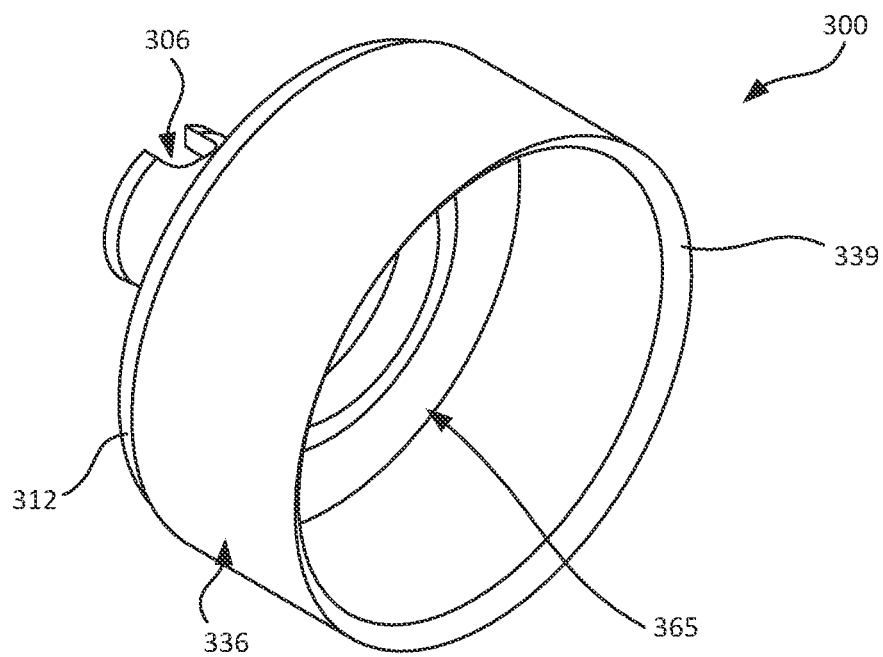
FIG. 3A illustrates a front perspective view of a solid baffle for a suppressor, in accordance with various embodiments.
Figure 3B:
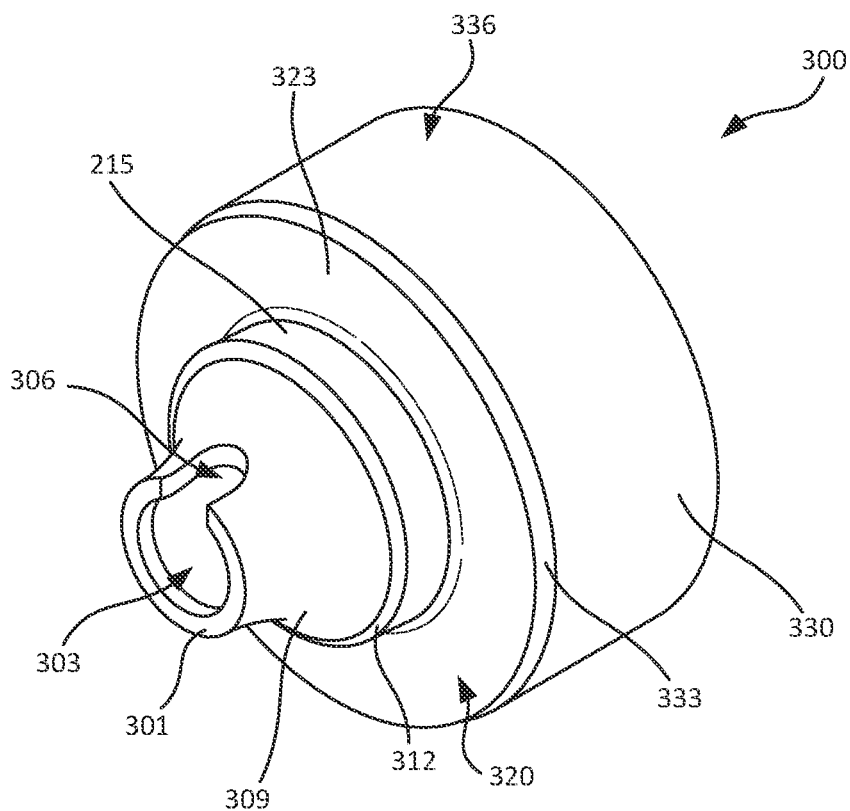
FIG. 3B illustrates a rear perspective view of the solid baffle for a suppressor of FIG. 3A, in accordance with various embodiments.
Figure 3C:
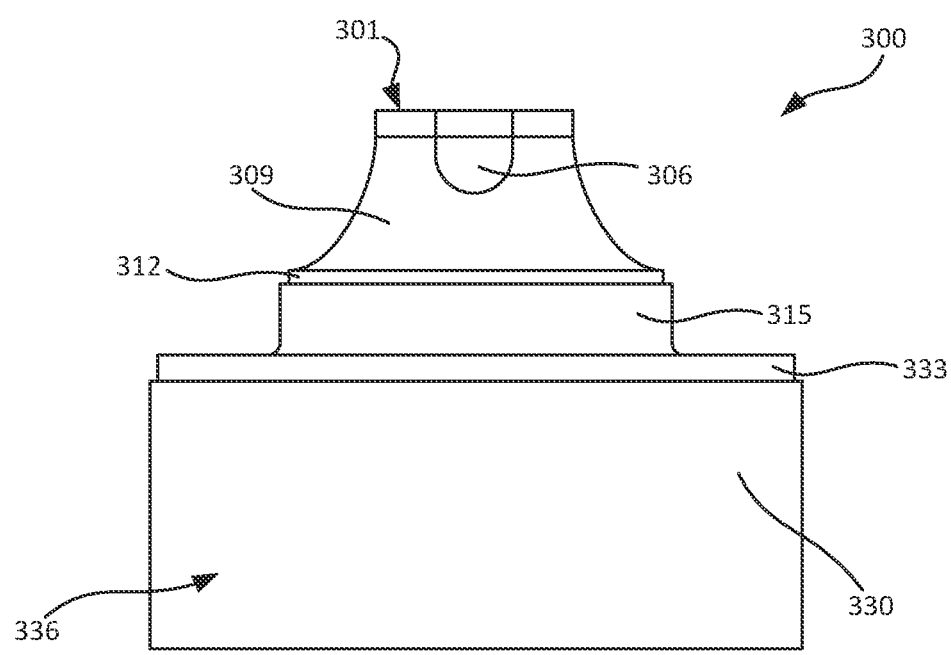
FIG. 3C illustrates a side view of the solid baffle for a suppressor of FIGS. 3A and 3B, in accordance with various embodiments.
Figure 3D:
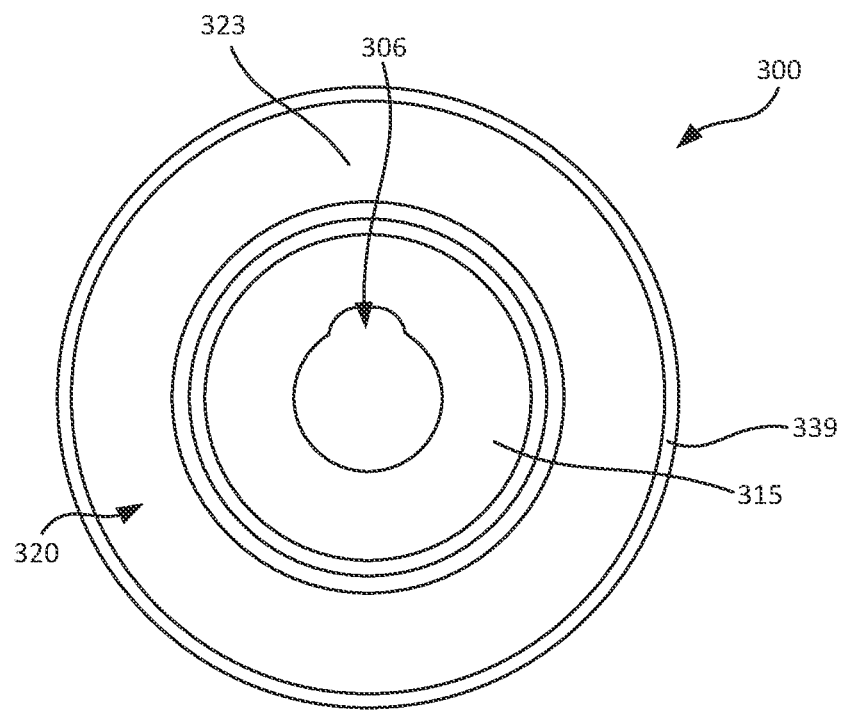
FIG. 3D illustrates a front view of the solid baffle for a suppressor of FIGS. 3A-3C, in accordance with various embodiments.
Figure 3E:
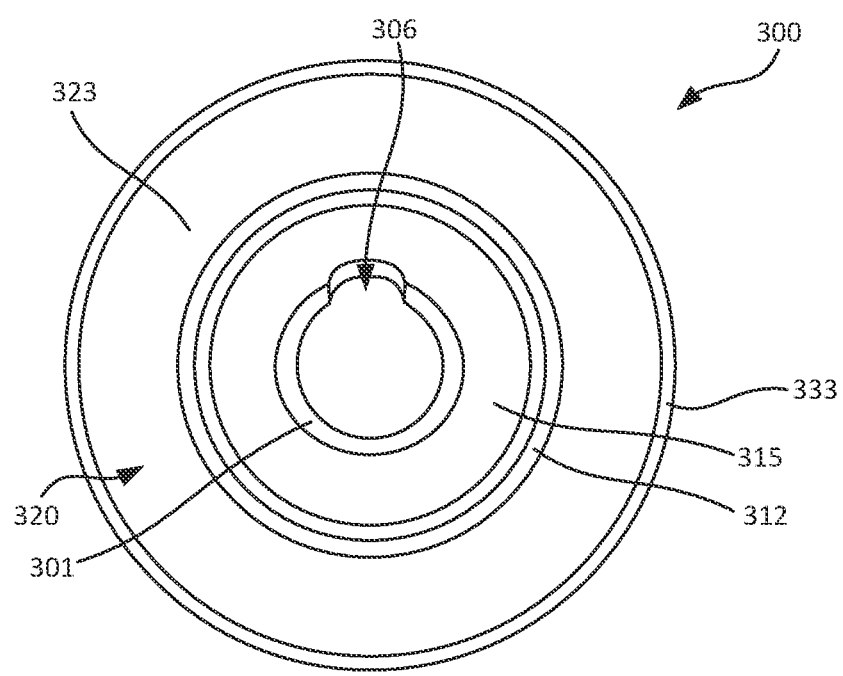
FIG. 3E illustrates a rear view of the solid baffle for a suppressor of FIGS. 3A-3D, in accordance with various embodiments.

In various embodiments, a solid baffle 300 may be configured to couple to a vented baffle 200 forward of such vented baffle 200 in a similar manner to vented baffles 200 coupling to one another, as discussed herein. Similarly, a solid baffle 300 may be configured to couple to a vented baffle 200 aft of such vented baffle 200 in a similar manner to vented baffles 200 coupling to one another, as discussed herein. With reference to FIGS. 1B, 2A-2E, and 4C, a solid baffle 300 may couple to a vented baffle 200 as part of suppressor 100. In various embodiments, the inner wall forward edge 262 of the vented baffle 200 may couple to the inner wall aft edge 312 of solid baffle 300. Thus, the inner wall 270 of the vented baffle 200 couples to neck portion 315 of solid baffle 300, forming inner wall 120A (or a portion thereof). In various embodiments, inner wall forward edge 262 of a vented baffle 200 may have a shape that is complementary to a shape of inner wall aft edge 312 of a solid baffle 300, which may facilitate coupling between such edges of the vented baffle 200 and solid baffle 300 (e.g., providing a tight fit that is at least partially air-tight, such that little or no gas may flow radially between the coupled the baffles). For example, as seen in FIG. 3C, inner surface aft edge 312 may comprise a recess disposed in neck portion 315 such that inner surface aft edge 312 comprises a shape having a 90-degree angle, and inner surface forward edge 262 of a vented baffle 200 may comprise a similar recess (e.g., in an inner surface of baffle inner wall 270) having a complementary shape with a complementary 90-degree angle.

In various embodiments, the outer wall forward edge 239 of a vented baffle 200 may couple to the outer wall aft edge 333 of a solid baffle 300. Thus, the outer wall 230 of the vented baffle 200 couples to the outer wall 330 of the solid baffle 300, forming outer wall 180 (or a portion thereof). In various embodiments, outer wall forward edge 239 of a vented baffle 200 may have a shape that is complementary to a shape of outer wall aft edge 333 of solid baffle 300, which may facilitate coupling between such edges of vented baffles 200 and solid baffle 300 (e.g., providing a tight fit that is at least partially air-tight, such that little or no gas may radially flow between the coupled baffles). For example, outer wall forward edge 239 of a vented baffle 200 and outer wall aft edge 333 of a solid baffle 300 may comprise complementary shapes similar to those described in relation to inner wall forward edge 262 of a vented baffle 200 and inner surface aft edge 312 of a solid baffle 300, discussed above.

In various embodiments, a vented baffle 200 may couple to a solid baffle 300 forward of the solid baffle 300. For example, an outer wall aft edge 233 of the vented baffle 200 may couple to an outer wall forward edge 339 of the solid baffle 300. Thus, baffle outer wall 230 of vented baffle 200 and solid baffle outer wall 330 of solid baffle 300 may or (at least a portion of) outer wall 180 of the baffle stack and/or suppressor 100.

Shoulders 320 of a solid baffle 300 are disposed in outer fluid path 142 (or 142A), which provide a terminus for the respective outer fluid path. Thus, gas that enters an outer fluid path (e.g., outer fluid path 142B) through an outer fluid path inlet 141B, may travel the length of outer fluid path 142, but can go no further axially than the shoulder 330 of the respective solid baffle 300. Therefore, as seen in FIG. 1C, as gas enters suppressor 100 in response to a projectile (e.g., a bullet) passing through suppressor 100 and the baffle inlets therein, gas 146 that enters an outer fluid path travels the length of the respective outer fluid path, but can go no further axially because of a shoulder 323 of a solid baffle 300 ending the outer fluid path. Thus, the gas 146 must turn back at shoulder 323 (causing further turbulence within the outer fluid path, thus slowing and cooling gas 146, dampening the sound resulting therefrom), traveling back through the outer fluid path, exiting the outer fluid path through the way the gas 146 entered the outer fluid path (e.g., through an outer fluid path inlet), and then entering an inner fluid path (e.g., inner fluid path 165).

In various embodiments, a baffle stack of baffles for a suppressor may comprise any suitable number of vented baffles and solid baffles. For example, a baffle stack for a suppressor may comprise a set of one or more vented baffles 200 and a solid baffle 300 coupled to the forward-most vented baffle 200. As another example, a baffle stack for a suppressor may comprise a set of multiple vented baffles 200 and a solid baffle 300 coupled to the forward-most vented baffle 200 thereof, and then a vented baffle(s) 200 (or another set of vented baffles 200) coupled to the solid baffle 300 forward of the solid baffle, with a second solid baffle 300 coupled to the forward-most vented baffle 200 of the forward set of vented baffles 200 (similar to baffle stack 108 of suppressor 100). For example, an outer wall aft edge 233 of a vented baffle 200 may couple to an outer wall forward edge 339, for example, in the manner described herein relating to the coupling of other baffles. In various embodiments, the forward-most baffle 150 of a baffle stack may be a vented baffle 200. In various embodiments, the forward-most baffle 150 of a baffle stack may be a solid baffle 300. In various embodiments, the aft-most baffle 150 of a baffle stack may be a vented baffle 200. In various embodiments, the aft-most baffle 150 of a baffle stack may be a solid baffle 300.

Having two solid baffles 300 in a baffle stack 108 may allow further slowing and cooling of gas that enters the suppressor, thus further dampening the sound resulting from such gas. For example, with reference to FIG. 1C, gas 146 may enter outer fluid path 142A, travel the length thereof, and then travel the length of outer fluid path 142A in the opposite direction (a rearward direction) after being unable to travel further axially because of shoulder 323 of the first solid baffle 300. The gas may then exit outer fluid path 142A and enter inner fluid path 165 (shown as gas 166). After gas 166 passes through inlet 303 of the first solid baffle 300, gas 166 can enter outer fluid path 142B (then shown again as gas 146), created by vented baffles 200 disposed forward of the first solid baffle 300, through outer fluid path inlet 141B. Gas 146 may travel the length of outer fluid path 142B, then travel the length of outer fluid path 142B in the opposite direction (a rearward direction) after being unable to travel further axially because of shoulder 323 of the second solid baffle 300, and then exit outer fluid path 142B (again through outer fluid path inlet 141B). Then, the gas may once again enter inner fluid path 165 (shown as gas 166) of the baffles 150 forward of the first solid baffle 300, and travel forward until exiting suppressor 100. Thus, two solid baffles 300 allows two stages of outer fluid paths (142A and 142B) to slow and cool gas, thus suppressing the sound associated with such gas and expansion and movement thereof. As an aside, FIG. 1C depicts turbulent gas movement within suppressor 100, and it should be noted that there may be gas that flows through suppressor with little or no turbulence created in the inner or outer paths (e.g., flowing straight through the baffle inlets in the inner fluid path).

In various embodiments, inner fluid path 165 may comprise a plurality of baffle spaces (e.g., baffle spaces 164), wherein each baffle space 164 is disposed between two coupled baffles 150, within inner wall 120A of the baffle stack. Each baffle space 164 may be axially defined between the inlet portions 209 of two vented baffles 200, or between an inlet portion 209 of a vented baffle 200 and an inlet portion 309 of a solid baffle 300 forward thereof (a solid baffle 300 aft of a vented baffle 200 may create an outer fluid path inlet (e.g., 141B) rather than a baffle space 164). During operation of suppressor 100, gas 166 flowing through inner fluid path 165 may enter a baffle space 164 through the inlet (e.g., inlet 203 of a vented baffle 200) of the aft baffle 150. The gas 166 in the baffle space 164 may either continue through the forward baffle 150 inlet or contact the inlet portion of the forward baffle (e.g., inlet portion 209 of a vented baffle 200), which may slow and cool such gas 166, which then exits the respective baffle space 164 through the forward baffle inlet. The tapered shape of baffle inlet portions may cause a portion of the gas 166 to contact the inlet portions and enter baffle spaces 164 (thus slowing and cooling such gas by creating turbulence within baffle spaces 164), rather than allowing the gas to simply travel through baffle inlets (e.g., inlets 203 and 303) without creating significant turbulence.

In various embodiments, baffles 150 may comprise any suitable material, such as a metal or metal alloy (e.g., steel, stainless steel, aluminum, aluminum alloy, and/or the like). In various embodiments, each baffle 150 may be a single, integral and/or monolithic component.

Figure 7:
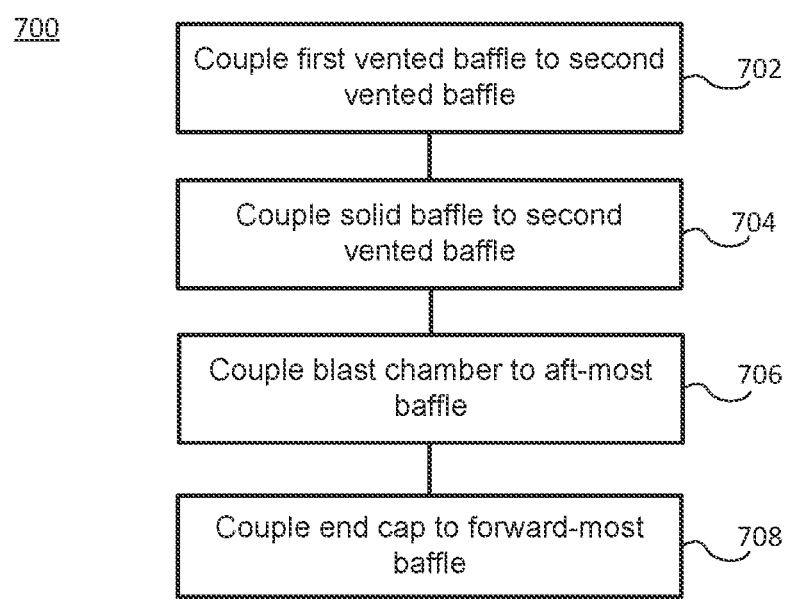
FIG. 7 illustrates a method for assembling a suppressor, in accordance with various embodiments.

With additional reference to FIG. 7, a method 700 for assembling a suppressor is depicted in accordance with various embodiments. In various embodiments, a baffle stack may be formed by coupled multiple baffles together. For example, by coupling a first vented baffle 200 to a second vented baffle 200 (step 702). The second vented baffle 200 may be forward of the first vented baffle 200. The vented baffles 200 may be coupled as discussed herein. In various embodiments, a solid baffle 300 may be coupled to the second vented baffle 200 (step 704) (as discussed herein). The second vented baffle 200 may be the forward-most vented baffle 200 (e.g., of a set of vented baffles 200 or of all vented baffles 200 in a baffle stack). The baffles 150 of the baffle stack (including first and second vented baffles 200 and the solid baffle 300) may be fixedly coupled to one another. For example, the outer walls 230 of the vented baffles 200, and the outer wall 330 of the solid baffle 300, may be welded or sintered together to form a continuous outer wall (e.g., outer wall 180), or a portion of a suppressor outer wall. In various embodiments, the outer surfaces and outer walls of the baffles 150 (e.g., outer surfaces 236 of outer walls 230 of vented baffles 200, and outer surface 336 of outer wall 330 of solid baffle 300) may be the outer surfaces and outer walls of the suppressor 100.

In various embodiments, a blast chamber 500 may be coupled to an aft-most baffle 150 (step 706). The aft-most baffle to which blast chamber 500 is coupled may be a vented baffle 200. In various embodiments, the aft-most baffle to which blast chamber 500 is coupled may be a solid baffle 300. Blast chamber 500 may comprise a coupling edge 560 (or a forward edge) that couples to the outer wall aft edge 233 of a vented baffle 200 (which can be similar to the coupling between baffles, as discussed herein). The outer wall of blast chamber 500 may be comprised in the outer wall 180 of suppressor 100. Blast chamber 500 may be coupled to the respective baffle 150 in any suitable manner (e.g., fixedly coupled by welding, sintering, and/or the like). In response to gas entering suppressor 100 in response to a bullet traveling therethrough, gas may enter blast chamber 500, and travel therefrom into an outer fluid path or an inner fluid path.

In various embodiments, an end cap 600 may be coupled to a forward-most baffle 150 (step 708). The forward-most baffle to which end cap 600 is coupled may be a solid baffle 300. In various embodiments, the forward-most baffle to which end cap 600 is coupled may be a vented baffle 200. End cap 600 may comprise a coupling edge 660 (or an aft end) that couples to the outer wall forward edge 339 of a solid baffle 300 (which can be similar to the coupling between baffles, as discussed herein). As discussed herein, projectile channel 603 of end cap 600 may be axially aligned with the inlets of baffles 150 (e.g., inlets 203 and 303) such that a projectile may flow through the baffle inlets and exit suppressor 100 through projectile channel 603. The outer wall of end cap 600 may be comprised in the outer wall 180 of suppressor 100. End cap 600 may be coupled to the respective baffle 150 in any suitable manner (e.g., fixedly coupled by welding, sintering, and/or the like). Lip 615 protruding from a forward surface of end cap 600 may further guide gas exiting suppressor 100 in the forward direction and away from the firearm user.

In various embodiments, suppressor 100, having three vented baffles 200 coupled together along axis 95 aft of a first solid baffle 300 (coupled to the forward-most vented baffle 200 of the first three vented baffles 200), four vented baffles 200 coupled together along axis 95 forward of the first solid baffle 300 and coupled thereto, and a second solid baffle 300 (coupled to the forward-most vented baffle 200 of the four vented baffles 200), between blast chamber 500 and end cap 600, may produce beneficial sound suppression results. Various tests, as discussed below, were conducted for suppressor 100 having a bore sized for 30-caliber projectiles, and having an outer diameter of 1.6 inches. For each test, microphones were placed to the left and right of, and behind, the suppressor muzzle, at locations as dictated by Military Standard 1474D (MIL-STD-1474D) (Department of Defense Design Criteria Standard—Noise Limits), which is incorporated by reference herein, and decibel levels were measured using PULSE electroacoustic software produced by Bruel & Kjaer EMS Pty. Ltd.

Firing five rounds of M118LR 7.62×51 ammunition, decibel levels were measured from a firearm having a 23-inch barrel with suppressor 100 (in the 30-caliber configuration discussed above) coupled to the firearm muzzle, under the conditions and using the instrumentation described above. The average decibel level achieved by suppressor 100 at the muzzle was 130.3 decibels (dB), and at the shooter's ear was 123.9 dB (compared to typical decibel levels for the same caliber without a suppressor of about 160 dB or greater). These results are well below the hearing-safe level of 140 dB dictated by the Occupational Safety and Health Administration (OSHA) of the U.S. Department of Labor for "impulsive or impact noise." These results are also significantly below common suppressor performance for the 7.62×51 cartridge, which may be about 135 dB or higher.

Firing five rounds of 220-grain 300 Blackout American Eagle® subsonic ammunition manufactured by Federal Cartridge Company, doing business as Federal Premium®, decibel levels were measured from a firearm having an 8-inch barrel with suppressor 100 (in the 30-caliber configuration discussed above) coupled to the firearm muzzle. The average decibel level achieved by suppressor 100 at the muzzle was 125.3 decibels (dB), and at the shooter's ear was 117.9 dB (compared to typical decibel levels for the same caliber without a suppressor of about 160 dB or greater). Firing five rounds of 190-grain 300 Blackout Sub-X® Hornady® ammunition manufactured by Hornady Manufacturing Company, decibel levels were measured from a firearm having an 8-inch barrel with suppressor 100 (in the 30-caliber configuration discussed above) coupled to the firearm muzzle. The average decibel level achieved by suppressor 100 at the muzzle was 122.8 decibels (dB), and at the shooter's ear was 116.4 dB (compared to typical decibel levels for the same caliber without a suppressor of about 160 dB or greater). These results for the 300 Blackout caliber are well below the hearing-safe level of 140 dB dictated by the Occupational Safety and Health Administration (OSHA) of the U.S. Department of Labor for "impulsive or impact noise." These results are also significantly below common suppressor performance for the 300 Blackout cartridge, which may be about 130 dB or higher at the muzzle, or about 120 or higher at the shooter's ear.

As will be appreciated, the suppressor systems and methods described herein maybe adapted to any desired or suitable caliber (e.g., by making the suppressor have a suitable thickness and bore size). For example, for a suppressor configured to fire 5.56 millimeter (mm) NATO ammunition, the suppressor may have a 1.5-inch outer diameter (outer diameter may be the diameter of circular outer wall 180 of suppressor 100). Further with the suppressor configuration example for firing 5.56 mm NATO ammunition, such a suppressor may comprise one solid baffle 300 as the forward-most baffle, and then a set of three or four vented baffles 200 aft of the solid baffle 300 (unlike suppressor 100 having two solid baffles 200 and two sets of vented baffles 200 separated by the aft solid baffle 300 of the two solid baffles 300). As another example, for a suppressor configured to fire 0.375 caliber ammunition, the suppressor may have a 1.7-inch outer diameter. As another example, for a suppressor configured to fire 0.50 caliber ammunition (e.g., the 50 Browning Machine Gun (0.50 BMG) cartridge), the suppressor may have a 2.4-inch outer diameter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A baffle stack for a suppressor, comprising:
a plurality of baffles coupled along an axis,
wherein the plurality of baffles form an outer fluid path and an inner fluid path that are radially fluidly separate, wherein the outer fluid path comprises an outer fluid path inlet, which is also an outer fluid path outlet for the outer fluid path, such that gas that enters the outer fluid path only through the outer fluid path inlet also exits the outer fluid path only through the outer fluid path inlet, and exits the suppressor through the inner fluid path, wherein no fluid exits the baffle stack except through either the inner fluid path or a blast chamber of the baffle stack at an attachment end of the suppressor and comprising a chamber comingling the inner fluid path and the outer fluid path adjacent to a barrel of a firearm and attachable to the barrel of the firearm,
wherein the plurality of baffles comprises:
a first vented baffle comprising a first inner wall spanning axially between a first inner wall forward edge and a first inner wall aft edge, and a first outer wall spanning axially between a first outer wall forward edge and a first outer wall aft edge, wherein the first vented baffle further comprises a first shoulder spanning radially between the first inner wall and the first outer wall; and
a second vented baffle comprising a second inner wall spanning axially between a second inner wall forward edge and a second inner wall aft edge, and a second outer wall spanning axially between a second outer wall forward edge and a second outer wall aft edge, wherein the second vented baffle further comprises a second shoulder spanning radially between the second inner wall and the second outer wall,
wherein the second inner wall aft edge couples to the first inner wall forward edge, such that the first inner wall and the second inner wall form an inner wall of the baffle stack that at least partially surrounds and defines the inner fluid path about the axis, and
wherein the second outer wall aft edge couples to the first outer wall forward edge, such that the first outer wall and the second outer wall form an outer wall of the baffle stack, wherein the outer fluid path is at least partially defined radially outwardly by the outer wall of the baffle stack and radially inwardly by the inner wall of the baffle stack.

2. The baffle stack of claim 1, wherein the first inner wall forward edge comprises a first inner wall forward edge shape that is complementary to a second inner wall aft edge shape of the second inner wall aft edge, and wherein the first outer wall forward edge comprises a first outer wall forward edge shape that is complementary to a second outer wall aft edge shape of the second outer wall aft edge.

3. The baffle stack of claim 1, wherein the first shoulder and the second shoulder are disposed in the outer fluid path, wherein the first shoulder comprises a first vent disposed therethrough, and wherein the second shoulder comprises a second vent disposed therethrough, wherein the first vent and the second vent allow gas to flow through the outer fluid path.

4. The baffle stack of claim 3, further comprising:
a solid baffle comprising a solid baffle inner wall spanning axially between a solid baffle inner wall forward edge and a solid baffle inner wall aft edge, and a solid baffle outer wall spanning axially between a solid baffle outer wall forward edge and a solid baffle outer wall aft edge, wherein the solid baffle further comprises a solid baffle shoulder spanning radially between the solid baffle inner wall and the solid baffle outer wall,
wherein the solid baffle inner wall aft edge couples to the second inner wall forward edge, such that the solid baffle inner wall is comprised in the inner wall that defines the inner fluid path,
wherein the solid baffle outer wall aft edge couples to the second outer wall forward edge, such that the solid baffle outer wall is comprised in the outer wall, and wherein the solid baffle shoulder is solid and serves as a terminus to the outer fluid path.

5. The baffle stack of claim 4, wherein the first vented baffle comprises a first inlet portion spanning axially between a first inlet edge and the first inner wall aft edge, wherein the first inlet edge defines a first inlet, wherein the second vented baffle comprises a second inlet portion spanning axially between a second inlet edge and the second inner wall aft edge, wherein the second inlet edge defines a second inlet, wherein the first inlet and the second inlet are comprised in the inner fluid path.

6. The baffle stack of claim 5, wherein the first inlet portion tapers outwardly from the first inlet edge to the first inner wall aft edge such that the first inner wall aft edge comprises a larger perimeter than the first inlet, and wherein the second inlet portion tapers outwardly from the second inlet edge to the second inner wall aft edge such that the second inner wall aft edge comprises a larger perimeter than the second inlet.

7. The baffle stack of claim 6, wherein the inner fluid path comprises a plurality of baffle spaces, wherein a first baffle space of the plurality of baffle spaces is defined within the inner wall between the first inlet portion and the second inlet portion, wherein gas enters the first baffle space through the first inlet, contacts the second inlet portion, and exits the first baffle space through the second inlet.

8. The baffle stack of claim 7, wherein the solid baffle comprises a solid baffle inlet portion spanning axially between a solid baffle inlet edge and the solid baffle inner wall aft edge, wherein the solid baffle inlet edge defines a solid baffle inlet,
   wherein a second baffle space of the plurality of baffle spaces is defined within the inner wall between the second inlet portion and the solid baffle inlet portion, wherein gas enters the second baffle space through the second inlet, contacts the solid baffle inlet portion, and exits the second baffle space through the solid baffle inlet.

9. The baffle stack of claim 6, wherein the first inlet portion comprises a first cutout, such that the first inlet edge defines the first cutout.

10. The baffle stack of claim 9, wherein the first shoulder of the first vented baffle comprises the first vent and a first solid portion, wherein the first cutout is at least one of axially or radially aligned with the first solid portion.

11. The baffle stack of claim 10, wherein the first shoulder comprises a plurality of first vents including the first vent, wherein the plurality of first vents are spaced equidistantly about the axis.

12. The baffle stack of claim 1, wherein the first inner wall of the first vented baffle comprises a first neck portion and a first skirt, wherein the first neck portion is disposed aft of the first shoulder and comprises the first inner wall aft edge, and wherein the first skirt is disposed forward of the first shoulder and comprises the first inner wall forward edge.

13. The suppressor of claim 4, further comprising a blast chamber coupled to an aft-most vented baffle of the plurality of baffles aft of the aft-most vented baffle, wherein the aft-most vented baffle comprises a vented baffle outer wall spanning between a vented baffle outer wall aft edge and a vented baffle outer wall forward edge,
   wherein the blast chamber spans axially between a blast chamber forward end and a blast chamber aft end, wherein the blast chamber forward end comprises a blast chamber coupling edge that couples to the vented baffle outer wall aft edge, and wherein the blast chamber aft end is configured to couple to the firearm.

14. The suppressor of claim 13, further comprising an end cap coupled to the solid baffle, wherein the end cap comprises an end cap coupling edge that couples to the solid baffle outer wall forward edge.

15. The suppressor of claim 14, wherein the end cap comprises a projectile channel disposed through the end cap in fluid communication with the inner fluid path of the baffle stack and axially aligned with a baffle inlet of each of the plurality of baffles.

16. The suppressor of claim 15, wherein the end cap comprises an end cap muzzle, through which a projectile will exit the suppressor during use, wherein the end cap comprises a flash hider comprising a plurality of protrusions protruding in a forward direction around the end cap muzzle.

17. A method of assembling the baffle stack of claim 4.

* * * * *